United States Patent [19]

Munekata et al.

[11] 4,434,585
[45] Mar. 6, 1984

[54] BED FOR GRINDING MACHINE

[75] Inventors: Kenichi Munekata; Kunihiko Unno; Yasuo Suzuki, all of Kariya, Japan

[73] Assignee: Toyoda Koki Kabushiki Kaisha, Kariya, Japan

[21] Appl. No.: 270,024

[22] Filed: Jun. 3, 1981

[30] Foreign Application Priority Data

Jun. 6, 1980 [JP] Japan .............................. 55-79677[U]

[51] Int. Cl.³ .............................................. B24B 41/00
[52] U.S. Cl. .................................... 51/166 R; 523/466
[58] Field of Search ...................... 51/166 R, 314, 267; 248/117.3, 117.4, 346, DIG. 1; 108/28, 161; 523/466

[56] References Cited

U.S. PATENT DOCUMENTS 2,343,556  3/1944  Jacobsen ............................ 51/267 X
2,622,952 12/1952  Wilhide ............................... 51/166 R
3,793,285  2/1974  Koss .................................. 523/466 X
4,274,229  6/1981  Favrot ............................ 51/166 R X

FOREIGN PATENT DOCUMENTS 2133315  1/1973  Fed. Rep. of Germany ...... 108/161

Primary Examiner—E. R. Kazenske
Assistant Examiner—Douglas D. Watts
Attorney, Agent, or Firm—Oblon, Fisher, Spivak, McClelland & Maier

[57] ABSTRACT

A bed for a grinding machine includes a bed body formed at the upper surface thereof with a coolant receiving portion on which a layer of resin mortar is formed. The resin mortar is formed by a mixture of epoxy resin, a hardner and sand with a weight ratio of approximately 12.2:2.8:85. The bed includes a peripheral wall and the coolant receiving portion is trough shaped and has a flat surface portion so as to communicate with a coolant exhaust conduit.

2 Claims, 3 Drawing Figures

BED FOR GRINDING MACHINE

BACKGROUND OF THE INVENTION

1. Field of the Invention

The present invention relates to a bed for a grinding machine.

2. Description of the Prior Art

Conventionally, in order to prevent thermal deformation of a bed in a grinding machine due to the cooling action of a coolant, a coolant trough is formed by sheet metal working separately from the bed, and is mounted on the bed either through adiabatic material or formation of an air gap. However, these arrangements have been found to be expensive to produce.

SUMMARY OF THE INVENTION

It is, therefore, an object of the present invention to provide an improved bed for a grinding machine capable of preventing thermal deformation of the bed due to cooling action of coolant.

Another object of the present invention is to provide an improved bed as described hereinabove, wherein resin mortar is formed on a coolant receiving portion of the bed.

Briefly, according to the present invention, these and other objects are achieved by providing a bed for a grinding machine, as mentioned below. A bed body is formed at the upper surface thereof with a table support portion for slidably supporting a table of the grinding machine, a wheel head support portion for supporting a wheel head of the grinding machine and a coolant receiving portion. Resin mortar is formed on the coolant receiving portion by a mixture of epoxy resin, a hardener and sand.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
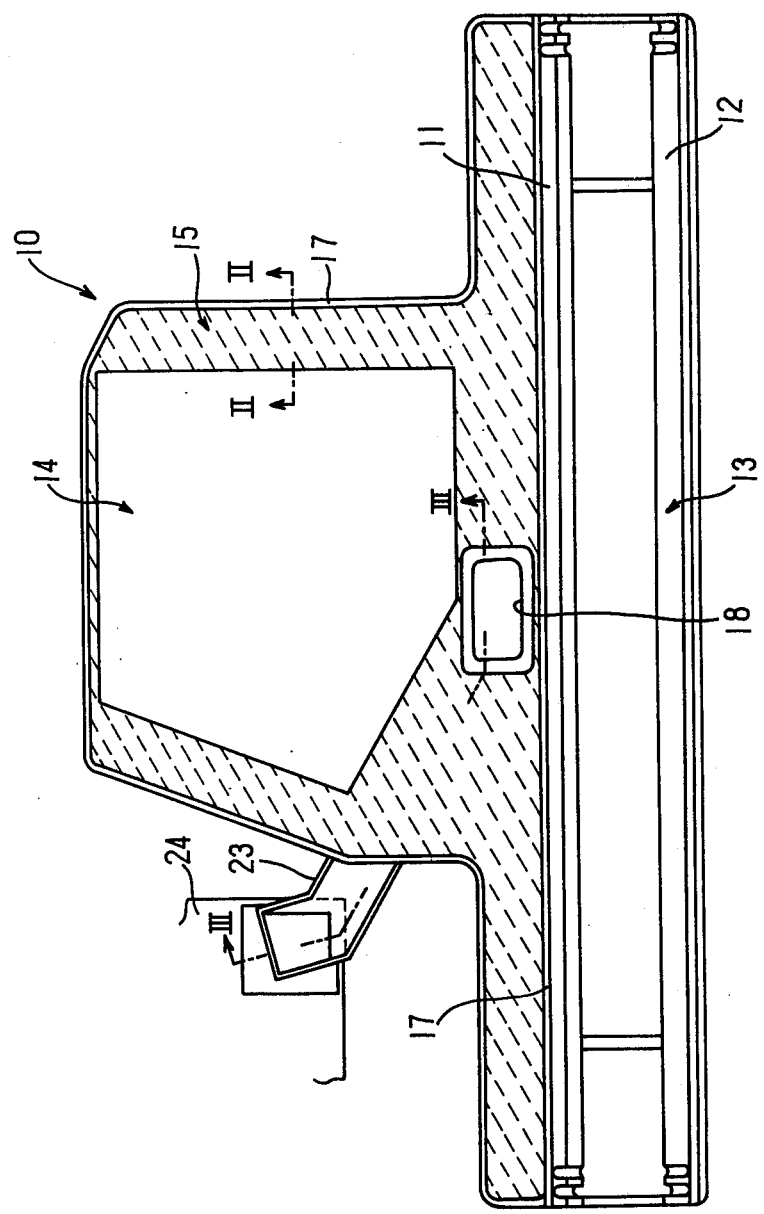
FIG. 1 is a plan view of a bed for a grinding machine according to the present invention.

Referring now to the drawings, and more particularly to FIG. 1, there is shown a bed body 10 made of cast iron for a grinding machine. Bed body 10 includes a table support portion 13 located at the front portion thereof and including a V-shaped guide way 11 and a flat guide way 12 for slidably supporting a table (not shown) in a longitudinal direction, a wheel head support portion 14 located at the rear portion thereof for mounting a slide base (not shown) to slidably guide a wheel head (not shown) and a trough-shaped coolant receiving portion 15.

Figure 2:
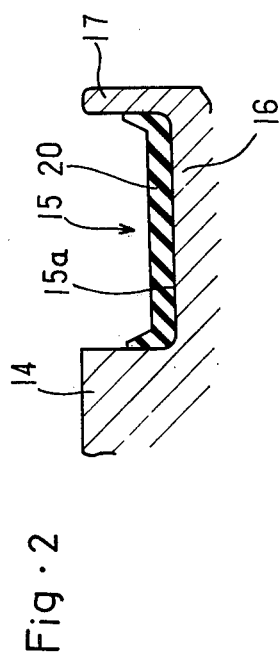
FIG. 2 is an enlarged sectional view taken along the lines II—II in FIG. 1.

As shown in greater detail in FIG. 2, coolant receiving portion 15 includes a flat surface 16 formed between support portions 13, 14 and recessed from support portions 13 and 14, and a peripheral wall 17 projecting from and surrounding flat surface 16. In this embodiment, coolant receiving portion 15 is shown as being cast or formed integrally with bed body 10. However, coolant receiving portion 15 may be formed of sheet metal and fastened on bed body 10.

A coolant exhaust hole 18 is formed between table support portion 13 and wheel head support portion 14 for exhaust of the coolant into coolant receiving portion 15. In order to facilitate exhaust of the coolant, flat surface 16 is sloped downwardly toward exhaust hole 18.

As also shown in FIG. 2, a layer of resin mortar 20 serving as adiabatic material is formed on flat surface 16 to prevent the coolant from directly contacting bed body 10. A layer of resin mortar 20 may be formed on the side faces of the support portion 14 and peripheral wall 17, if necessary. The layer of resin mortar 20 is shown in dotted lines in FIG. 1.

In order to prepare resin mortar 20, epoxy resin, such as ARALDITE GY1252JP made by CIBA-GEIGY, is first mixed with a hardener, such as HY956 also made by CIBA-GEIGY at a weight ratio of 100 to 22.5. Such mixture of epoxy resin and hardener is then mixed with sand at a weight ratio of 15 to 85. A final mixture of epoxy resin, hardner and sand is applied to coolant receiving portion 15 with uniform thickness of about 15 mm. It is preferable to remove any grease from the surface of coolant receiving portion 15 in order to assure proper adhesion.

Figure 3:
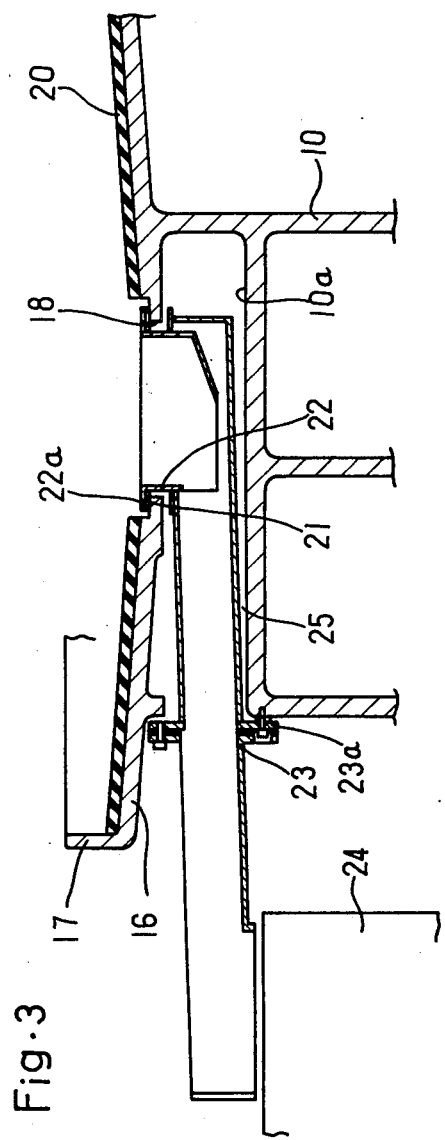
FIG. 3 is an enlarged sectional view taken along the lines III—III in FIG. 1.

As shown in FIG. 3, a flange portion 22a of a coolant exhaust conduit 22 is secured on the top surface of exhaust hole 18 through a packing member 21 made of synthetic rubber or synthetic resin. A coolant shoe 23 is disposed beneath exhaust conduit 22 to discharge coolant into a coolant tank 24 located outside bed body 10. Coolant shoe 23 is adibatically received in a cavity 10a formed within bed body 10 through an air gap 25 and is secured at a flange portion 23a to bed body 10 with a small contact area.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A bed for a grinding machine having a table and a wheel head and comprising:
   a bed body having at an upper surface portion thereof a table support portion for slidably supporting said table of said grinding machine, a wheel head support portion for supporting said wheel head of said grinding machine, and a coolant receiving portion including a peripheral wall of said bed body, a trough portion surrounding the remainder of said bed body inside said peripheral wall and a flat surface portion formed between said support portions and recessed from said support portions and said peripheral wall, said peripheral wall projecting from and surrounding said flat surface portion;
   a layer of resin mortor formed on at least said flat surface portion defining said coolant receiving portion, wherein said bed body further comprises a peripheral wall and wherein said coolant receiving portion further comprises a trough shaped portion and a flat surface portion formed between said support portions and recessed from said support portions and said peripheral wall, said peripheral wall projecting from and surrounding said flat surface and said coolant receiving portion including an exhaust hole formed therein for exhausting coolant, said flat surface portion being sloped downwardly toward said exhaust hole and wherein said bed body has an air gap formed therein;

a coolant exhaust conduit communicating with a top surface portion of said exhaust hole for conducting coolant; and a coolant shoe mounted in said bed body extending into said air gap and connected to said coolant exhaust conduit for exhausting coolant outside said bed body.

2. A bed as claimed in claim 1, wherein said mixture of epoxy resin, hardener and sand is of a weight ratio of approximately 12.2:2.8:85.

* * * * *